United States Patent
Quaglino, III

(10) Patent No.: US 8,360,683 B2
(45) Date of Patent: Jan. 29, 2013

(54) COASTAL OIL RECOVERY SYSTEM

(76) Inventor: Angelo Vincent Quaglino, III, Chalmette, LA (US)

( * ) Notice: Subject to any disclaimer, the term of this patent is extended or adjusted under 35 U.S.C. 154(b) by 119 days.

(21) Appl. No.: 12/981,962

(22) Filed: Dec. 30, 2010

(65) Prior Publication Data

US 2012/0020737 A1    Jan. 26, 2012

Related U.S. Application Data

(60) Provisional application No. 61/400,191, filed on Jul. 23, 2010.

(51) Int. Cl.
 *B09C 1/02* (2006.01)
(52) U.S. Cl. .................. 405/128.25; 588/900
(58) Field of Classification Search ............ 405/60, 405/128.15, 128.2, 128.25; 210/170.01, 210/170.11; 588/249, 250, 900

See application file for complete search history.

(56) References Cited

U.S. PATENT DOCUMENTS

| | | | | |
|---|---|---|---|---|
| 5,325,795 A | * | 7/1994 | Nelson et al. | 110/236 |
| 5,836,718 A | * | 11/1998 | Price | 405/128.8 |
| 6,000,882 A | * | 12/1999 | Bova et al. | 405/128.85 |

* cited by examiner

*Primary Examiner* — Tara M Mayo-Pinnock
(74) *Attorney, Agent, or Firm* — Juan J. Lizarraga

(57) ABSTRACT

A coastal oil recovery system and method for clean up of land based contamination with a containment device having a reverse funnel shaped top hood, rigidly attached to vertical walled sides, a plurality of ground screws to pull the containment device into the soil, a plurality of water jets to fill the containment device and float oil from contaminated soil and vegetation upward into the top hood for extraction by discharge hoses. Due to the shape of the top hood, the depth of the floating oil will increase as it reaches the top of the top hood, facilitating extraction.

6 Claims, 3 Drawing Sheets

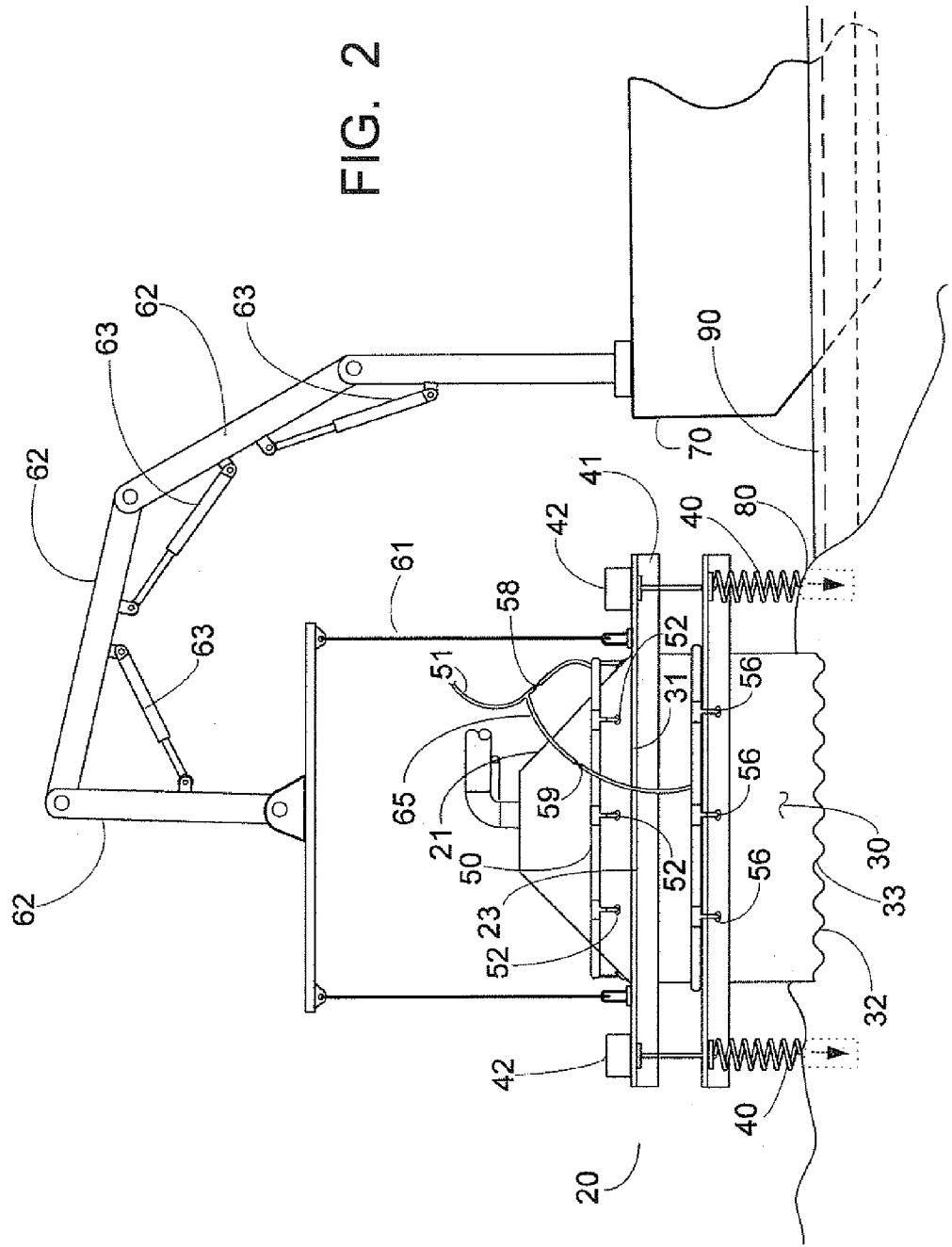

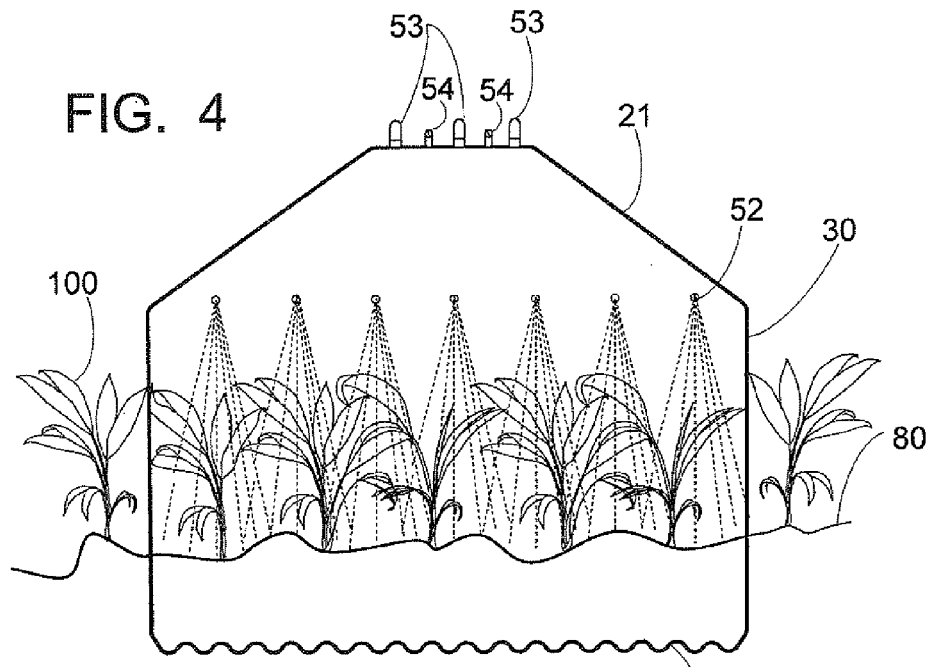
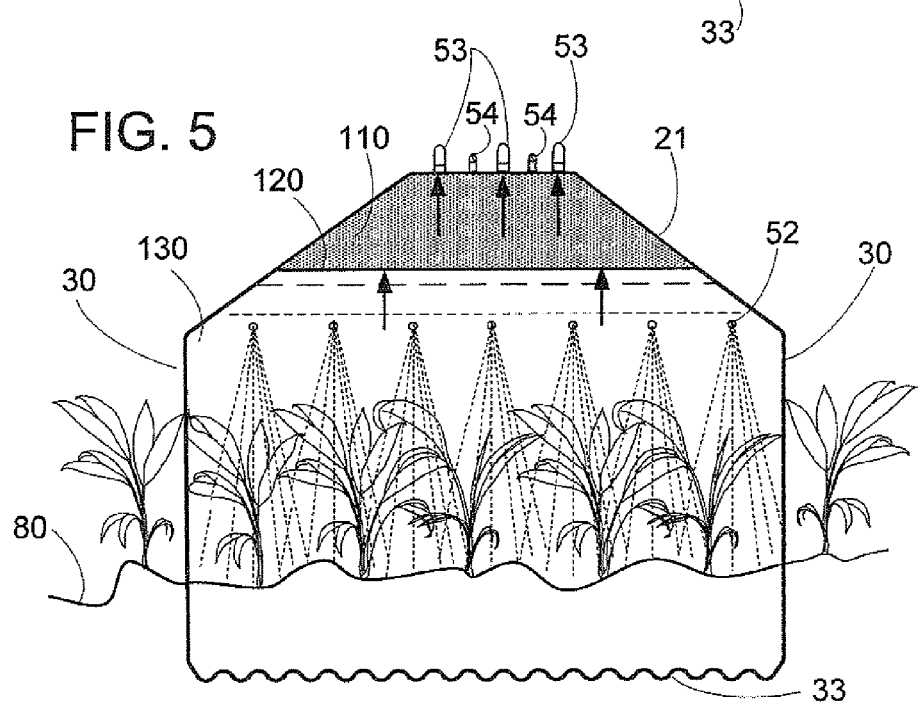

COASTAL OIL RECOVERY SYSTEM

This application claims priority from U.S. Provisional application Ser. No. 61/400,191 ("the '191 application") filed Jul. 23, 2010. The '191 application is incorporated herein by reference.

BACKGROUND OF THE INVENTION

This invention relates to systems and methods for fast recovery of oil and waste from "dry land" including beaches, marshland, grasses, ditches and other surfaces including but not limited to coastal lands without physically removing the land.

Numerous devices and methods have been introduced in the past to deal with the environmental devastation caused by the spillage of oil and petroleum substances in waterways, seas and oceans. The need for effective devices and methods has never been more needed than now in light of the terrible oil spill/leak currently threatening the Gulf Coast of the United States. In addition to cleaning up the waterways, seas and oceans, there is also a desperate need to clean up beaches, marshland, grasses, ditches and other coastal surfaces ultimately spoiled by the spillage of oil and petroleum substances.

Unfortunately, there are few devices designed to get oil or waste from "dry land". Aside from the very involved process of "vacuuming" up the oil with a hose, the only other way is to remove the land with a "Bobcat" or similar land excavating vehicle.

SUMMARY OF THE INVENTION

It is an object of the present invention to speed up the oil spill recovery process to prevent damage to the shoreline, coastal marshes, estuaries, beaches and other valuable and vital features of the coast of the United States in particular, especially along the Gulf of Mexico.

It is an object of this invention to provide a system to clean up "dry land" including beaches, marshland, grasses, ditches and other coastal surfaces with little or no impact to those surfaces.

Because oil floats it is carried onto land by waves where it sticks to the land making it difficult to remove without damage. The present invention uses the fact that oil floats as part of a system to remove it.

It is an object of this invention to provide a containment device with a conical top hood resembling an inverted funnel having a lower outer edge with vertical walled sides having an upper edge tightly sealed and connected to the lower outer edge of the top hood descending downward, said walled sides also having a bottom edge, preferably serrated, for driving into the land when the containment device is placed or lowered onto a land site for recovery of oil. It is also intended that the containment be fitted with a plurality of ground screws for pulling the containment device toward the land and driving the bottom edge of the vertical walled sides into the land to achieve a water tight seal. The containment device can be placed on a land site by suitable lifting arms or supports from a water based vessel such as a barge, or from a land based machine such as a crane.

It is also intended that the containment device be fitted with a suitable water header to feed a plurality of water jets located both in proximity to the connection of the upper edge of the vertical walled sides and the lower outer edge of the top hood and at a lower level on the vertical walled sides, said jets being used to fill the containment device once in place on a land site and driven into the land by the ground screws. It is intended that the water header will be adjustable to redirect the water flow to either the upper mounted water jets or the lower mounted water jets, depending on the amount of water in the containment device during filling. The water filling the containment device will float off the oil on the land and, as the containment device fills past the upper edge of the vertical walled sides, the floating oil will concentrate in depth as it rises up the inverted funnel shape of the top hood and this concentration of oil can then be pumped off through discharge hoses adjustable to the level of floating oil in the containment device for containment and disposal. Likewise, the containment device will be suitably vented to allow the release of air as the containment device is filled with water and to prevent the creation of a vacuum within the containment device due to the suction of the discharge hoses. It is also intended that the containment device be constructed of materials in such size and thicknesses as to support the hydrostatic pressure causing by filling the containment device with water and floating oil.

It is also intended that the containment device can operate in an open manner without the conical top.

Once a particular site has been successfully cleaned of oil, the ground screws can be reversed or unscrewed and the containment device lifted and moved to another site for cleaning.

BRIEF DESCRIPTION OF THE DRAWINGS

FIG. 2 is a side elevation of the coastal oil recovery system.

FIG. 4 is a cross section of the containment device embedded on a contaminated land site at the beginning of filling with water.

FIG. 5 is a cross section of the containment device embedded on a contaminated land site filled with water having the floating oil rising in the top hood.

DETAILED DESCRIPTION OF THE INVENTION

Figure 1:
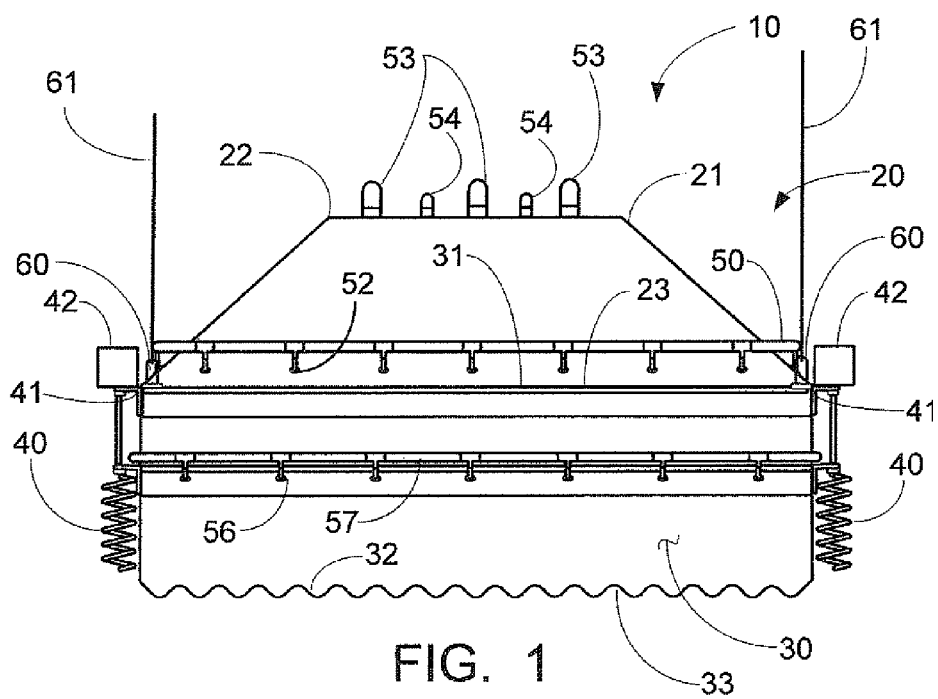
FIG. 1 is a front elevation of the coastal oil recovery system.

In FIG. 1 a front elevation of coastal oil recovery system 10 is depicted, showing the containment device 20 with a top hood 21 having an inverted funnel or conical shape and a top surface 22. The lower outer edge 23 of the top hood 21 is connected to the upper edge 31 of the vertical walled sides 30. The bottom edge 32 of the vertical walled sides 30 is shown as a serrated edge 33.

Also shown in FIG. 1 is a plurality of ground screws 40 supported on struts 41 housing ground screw drivers 42. While not seen in this view, a water supply 51 is feeding either an upper water header 50 or a lower water header 57, in turn respectively feeding either a plurality of upper water jets 52 or a plurality of lower water jets 56 for filling the containment device once firmly embedded in place at the land site to be cleaned.

At the top surface 22 of the top hood 21 are shown at least one discharge hose 53, vents 54, lifting pads 60 and lifting aim structures 61 for raising and lowering the containment device 20 at a selected site.

FIG. 2 depicts a side elevation of the coastal recovery system 10 with the containment device 20. In this Figure, segments 62 of the lifting aim structures 61 are depicted along with lifting arm actuators 63. Also shown is the water supply 51 feeding either a plurality of upper water jets 52 or a plurality of lower water jets 56. A cross header 65 allows transfer of the water supply 51 from the upper water header 50 to the lower water header 57 by use of the valves 58 and 59. In this depiction, the containment device 20 is being placed on land 80 by a barge 70 floating in water 90.

Figure 3:
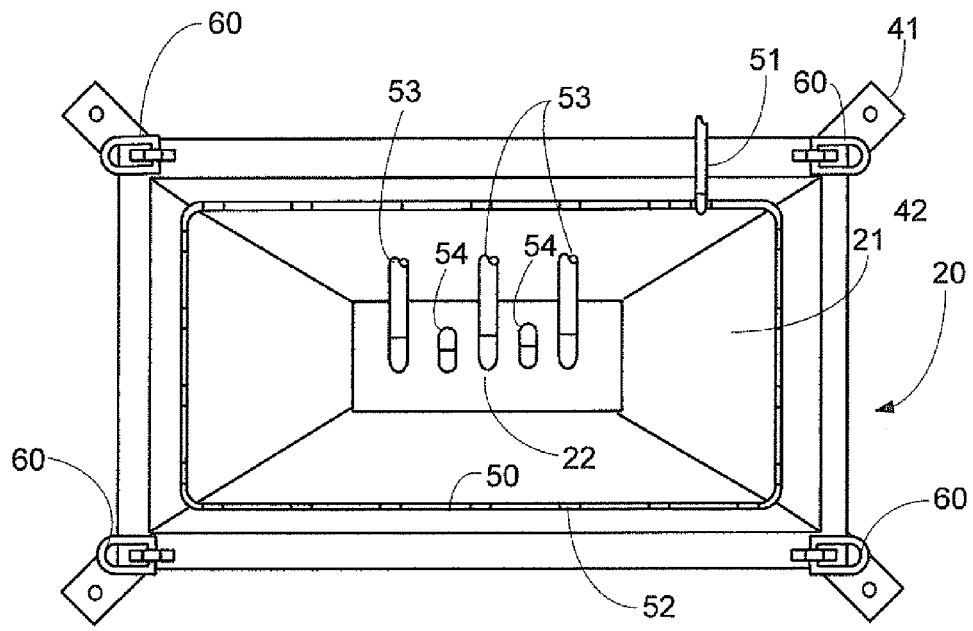
FIG. 3 is a plan view of the coastal oil recovery system.

FIG. 3 shows a plan view of the coastal recovery system 10 with the containment device 20. This view depicts the containment device 20 having a rectangular shape, but the containment device 20 could also be other shapes and still be effective. In FIG. 3, the containment device is shown with ground screws 40 mounted on struts 41 at each corner of the top hood 21. Also shown is placement of a plurality of upper water jets 52 being supplied from an upper water header 50. Also shown are discharge hoses 53, vents 54, and lifting pads 60. While not shown, it is intended the discharge hoses will extend downwardly into the containment device with a suction end and the discharge hoses will be vertically movable to adjust for the fluid level within the containment device so that the suction ends of the discharge hoses will be continually in contact with the upper level of the fluid rising in the containment device to efficiently extract any oil floating on the surface.

FIG. 4 shows a cross section of the containment device 20 embedded on a contaminated land site 80 at the beginning of filling with water from water jets 52. Also shown is vegetation 100.

FIG. 5 shows a cross section of the containment device 20 embedded on a contaminated land site 80 with the water 130 filling the containment device 20. Above the upper level 120 of the water 130 is the concentrated floating oil 110 that can be pumped out through the discharge hoses 53.

It is intended that the vertical walled sides be of substantial thickness and of a suitable metal or material that can withstand the hydrostatic pressure within the containment device 20 as it fills with water from the water jets 52.

Depending on the land site that needs to be cleaned, the containment device can be placed on site by the lifting arm structure 61 mounted on either a land base vehicle or a water based vessel. Once placed on the desired site, the containment device 20 will be pulled into the ground by the ground screws 40 to firmly entrench the bottom edge 32 of the vertical walled sides 30. To assist in this effort, the bottom edge 32 of the vertical walled sides 30 can be a serrated edge 33. It is understood that power for the ground screws 40 can be delivered though drivers 42, and the power source can come from either a land based or water based power supply, whether it be electric, hydraulic or pneumatic.

Once the containment device is firmly entrenched at the selected site, a water supply 51 from a land based or water based source will pressurize a water header 50 that will in turn feed a plurality of water jets 52 to begin to fill up the containment device 20. As the containment device 20 fills with water, the oil "stuck" to the land will float up. When the water level in the containment device 20 reaches the top hood 21, the surface oil will be forced up the top hood 21 and become more concentrated on the water surface because of the inverted funnel shape of the top hood 21. As the oil begins to reach the top surface 22 of the top hood 21, discharge hoses 53 can easily collect the concentrated oil riding at the top of the rapidly rising water surface.

Pumps for the discharge hoses 53 can be mounted to discharge the collected oil into suitable storage, whether land or water based. As in the case of other power requirements, the pumping power source can come from either a land based or water based power supply.

In an alternative embodiment the containment device 20 could be used without a top hood 21, and the benefits of floating the contaminated oil above the contaminated soil 80 and vegetation 100 could still be realized and the discharge hoses 53 can easily collect the concentrated oil riding at the top of the rising water surface.

I claim:

1. A system for recovery of oil and waste from land, comprising a containment device with a:
    top hood having a top surface and a lower outer edge;
    vertical walled sides having an upper edge and a bottom edge where the lower edge of the top hood is rigidly connected to the upper edge of the vertical walled sides;
    a plurality of ground screws with screw drivers for embedding the vertical walled sides in land;
    a water supply for filling the containment device when the vertical walled sides are embedded in land;
    at least one discharge hose and pump for recovery of oil and waste from the containment device;
    a lifting arm structure for raising and lowering the containment device.

2. The system of claim 1 wherein the top hood has a generally inverted funnel shape where the top surface has a smaller area than the area defined by the lower outer edge, and the bottom edge of the vertical walled sides is serrated to facilitate embedding the vertical walled sides in land.

3. The system of claim 2 wherein the water supply comprises at least one water header and a plurality of water jets.

4. The system of claim 2 wherein the lifting arm structure is affixed to and operated from a water based vessel.

5. The system of claim 2 wherein the lifting arm structure is affixed to and operated from a land based machine.

6. A method for recovery of oil and waste from land, comprising the steps of
    a) providing a containment device with a top hood having a top surface and a lower outer edge, vertical walled sides having an upper edge and a bottom edge where the lower edge of the top hood is rigidly connected to the upper edge of the vertical walled sides, a plurality of ground screws with screw drivers for embedding the vertical walled sides in land, a water supply for filling the containment device when the vertical walled sides are embedded in land, at least one discharge hose and pump for recovery of oil and waste from the containment device, a lifting arm structure for raising and lowering the containment device;
    b) using the lifting arm structure, lower the containment device on land contaminated with oil and waste such that the bottom edge of the vertical walled sides is in contact with the land;
    c) engage the ground screws driven by screw drivers and embed the vertical walled sides in the land;
    d) using the water supply, fill the containment device to float oil contaminating the land above the water;
    e) lower at least one discharge hose into the oil floating on the water filling the containment device from the water supply and pump the oil through the discharge hose out of the containment device;
    f) once all oil has been pumped out of the containment device, remove the water and disengage the ground screws;
    g) lift the containment device off the ground with the lifting arm structure and relocate to a new site.

* * * * *